UNITED STATES PATENT OFFICE.

JAMES C. ANDERSON, OF HIGHLAND PARK, ILLINOIS.

ORNAMENTAL BRICK.

SPECIFICATION forming part of Letters Patent No. 407,147, dated July 16, 1889.

Application filed August 26, 1887. Renewed November 26, 1888. Serial No. 291,932. (No specimens.)

*To all whom it may concern:*

Be it known that I, JAMES C. ANDERSON, a citizen of the United States of America, residing at Highland Park, in the county of Lake and State of Illinois, have invented certain new and useful Improvements in Ornamental Bricks, of which the following is a specification.

My invention relates to the manufacture of bricks for architectural and other purposes; and the object of my invention is to produce bricks which will present the appearance of the metal composing the same and show the actual dross of the metal upon the surface thereof in the form of spots or splotches.

My invention consists of a brick composed of clay and small particles of metallic brass mixed with the clay, the brass being fused in the burning of the brick and leaving the dross in the form of spots or splotches on the surface of the brick, while the main body assumes the color of the brass.

In carrying out my invention, to produce the best results, a pure clay is used in which there is none or practically none of the metallic oxides, and which in its natural state will burn to a white or slightly buff color. The clay is reduced to a fine dry powdered condition by any suitable mechanical means, and to each one hundred (100) parts I add about five (5) parts of metallic brass in a finely divided or comminuted condition in the form of coarse filings or sawings or fine chippings and intimately mix the same with the previously-prepared clay-powder, so as to form a homogeneous mass. The clay and finely divided metallic brass thus prepared are submitted to an intense pressure while in a dry state in suitable molds to bring it to the desired form and to eliminate the air therefrom. The bricks, blocks, or other shapes thus formed are now placed in a suitable kiln and fired to a degree of heat which will burn the brick to the desired hardness and fuse the metal, causing it to impart its color to the main body of the brick, and at the same time deposit the dross of the metal on the surface of the brick in the shape of spots or blotches.

The different shades of color in the main body of the brick may be varied by changing the proportions of the comminuted brass mixed with the clay; or other color effects may be obtained by using a small portion of suitable metallic oxides in a finely-powdered condition thoroughly incorporated with the clay in a dry state, as described in my patent, No. 262,339, of August 8, 1882, before mixing the clay mass with the finely-divided brass.

In bricks produced by this method the main body will be found to possess the same characteristics, color, texture, &c., as metallic brass, with the addition of numerous spots and blisters appearing on the surface of the same, giving it a mottled and highly-artistic appearance.

The metals are not oxidized, but fused within the clay body in the metallic state by the burning process, and remain in said bodies as metals. The color imparted to the brick does not exhibit the color of the oxide of the metal, but the color of the metal itself and the melted drosses of the metal, which metal colors and drosses go to make up the distinctive character of the brick claimed.

I am aware that it is not new to use the oxides of metal to give color to brick, and such I do not claim.

In an application filed by me December 21, 1888, Serial No. 294,306, I have claimed the composition from which the brick is made.

Having thus described my invention, what I claim is—

A brick or block the main body color of which is of brass and the surface thereof spotted or splotched with the dross of the metal contained therein, as set forth.

In testimony whereof I affix my signature in presence of two witnesses.

J. C. ANDERSON.

Witnesses:
M. C. SPRINGER,
O. A. O. RUNNGREN.